(No Model.)

R. H. EWING.
BEE HIVE.

No. 462,761. Patented Nov. 10, 1891.

Witnesses.
A. Ruppert
H. A. Daniels

Inventor.
Reuben H. Ewing
Per
Thomas P. Simpson
Atty.

UNITED STATES PATENT OFFICE.

REUBEN HOLCOMB EWING, OF MONDAMIN, IOWA, ASSIGNOR OF ONE-HALF TO JOHN B. WALLACE, OF SAME PLACE.

BEE-HIVE.

SPECIFICATION forming part of Letters Patent No. 462,761, dated November 10, 1891.

Application filed April 21, 1891. Serial No. 389,775. (No model.)

*To all whom it may concern:*

Be it known that I, REUBEN H. EWING, a citizen of the United States, residing at Mondamin, in the county of Harrison and State of Iowa, have invented certain new and useful Improvements in Bee-Hives; and I do hereby declare the following to be a full, clear, and exact description of the invention, such as will enable others skilled in the art to which it appertains to make and use the same.

The special object of the invention is to make a bee-hive in which the bees shall be protected from moths, mice, rain, and wind.

Figure 1:
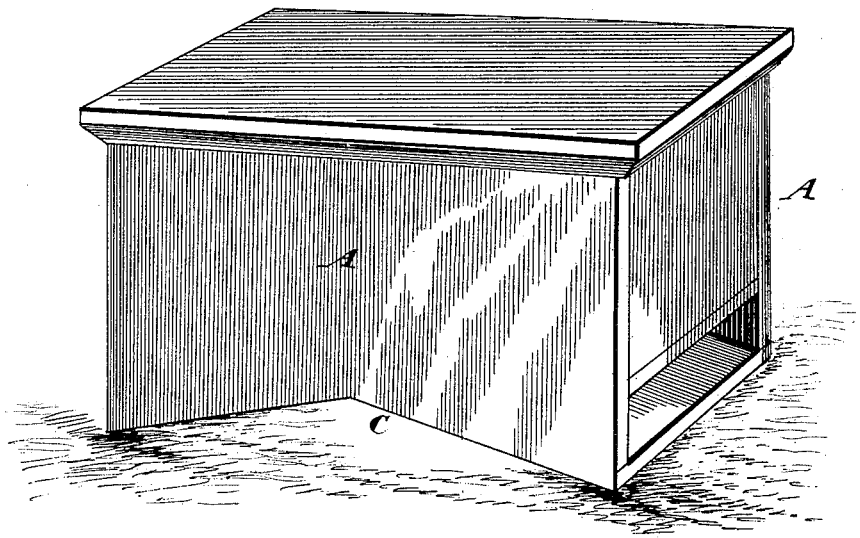
Figure 2:
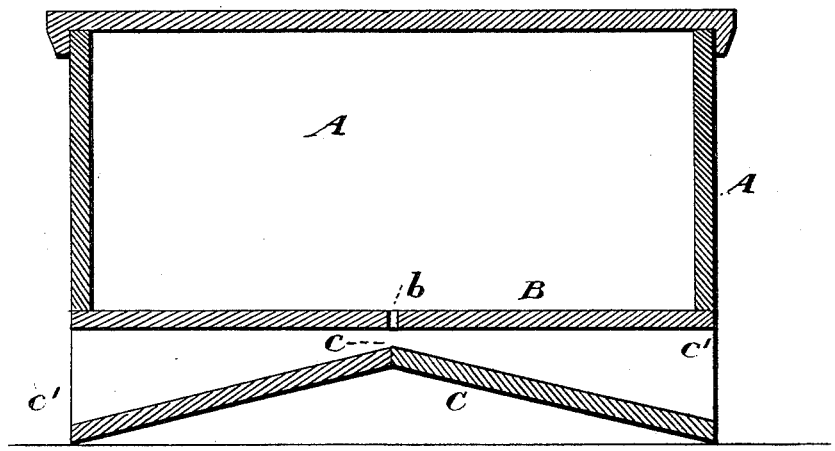

Figure 1 of the drawings is a perspective view of a bee-hive containing my improvement, and Fig. 2 a vertical section thereof.

In the drawings, A represents the hive, which is provided with the two bottoms B C, the bottom B being horizontal and provided with the hole $b$, just large enough to let the bees pass easily through it, while the second bottom C is in the form of an obtuse angle whose vertex $c$ is immediately under the entrance $b$. The bottoms B C are about four inches apart at the outer entrances $c'$ $c'$; but the lower angular bottom C gradually approaches the horizontal bottom C until the vertex $c$ is reached, said vertex being about three-eighths of an inch from the entrance $b$ to the body of the hive.

The tendency of the bee is to move upwardly, and as soon as he reaches the vertex $c$ he will make for the entrance $b$, while the moth will travel up one side of the bottom C and down the other, thereby failing to get into the honey or bee chambers at all, not being able to reach the hole $b$, even if inclined to do so. The entrance-hole $b$ being where it is, the mice are prevented from gnawing into the hive, as they have no good starting-point.

The honey-frames and the cap or section above, which receives the honey-boxes, are the same as in other hives, and are well known to the public.

In practice I find that the moth-miller rarely gets into the hive. When the eggs are laid on the bottom C the young moths cannot get into the hive, and the bees destroy them. The bees are also better protected from robber-bees on account of the location of the hive-entrance $b$, while they can come out on either end of the hive and in warm weather lie between the two bottoms. Rain and dirt cannot blow into the hive, while the entrance $b$ can never be blocked up with sleet and ice, so as to cause the bees to smother for the want of air, as sometimes occurs. Moreover, the comb will not mold in damp weather, as no current or draft of moist air can pass through the hive. Again, the bees are not apt to swarm in this hive, as they find it difficult to get the queen out, thus giving the bee-raiser a chance to divide and lose no swarms.

What I claim as new, and desire to protect by Letters Patent, is—

The bee-hive A, having a horizontal bottom B, with the central hole $b$, just large enough to allow the bees to pass through it, and an upwardly-convex bottom C, whose oppositely-inclined sides meet in a vertex $c$, directly under the said hole and just far enough therefrom to permit the bees to reach the hole, the said hive being provided with opposite entrances $c'$ $c'$ for the bees and moths between said bottoms, as shown and described.

In testimony whereof I have affixed my signature in presence of two witnesses.

REUBEN HOLCOMB EWING.

Witnesses:
GEORGE E. BAILEY,
L. H. BASSETT.